United States Patent
Na

(10) Patent No.: US 7,663,896 B2
(45) Date of Patent: Feb. 16, 2010

(54) ENERGY EFFECTIVE SWITCHING POWER SUPPLY APPARATUS AND AN ENERGY EFFECTIVE METHOD THEREOF

(75) Inventor: Tae-kwon Na, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 11/277,659

(22) Filed: Mar. 28, 2006

(65) Prior Publication Data

US 2007/0070658 A1    Mar. 29, 2007

(30) Foreign Application Priority Data

Sep. 27, 2005    (KR) ..................... 10-2005-0089890

(51) Int. Cl.
  *H02M 3/335*  (2006.01)
  *H02H 7/122*  (2006.01)
(52) U.S. Cl. ............... 363/56.01; 363/21.15; 363/21.07
(58) Field of Classification Search ................... 363/16, 363/21.01, 21.07, 21.08, 21.1, 21.15, 21.16, 363/21.18, 56.01, 56.09, 56.1
  See application file for complete search history.

(56) References Cited

U.S. PATENT DOCUMENTS

| | | | | |
|---|---|---|---|---|
| 4,975,823 | A | * | 12/1990 | Rilly et al. ............... 363/21.16 |
| 5,835,363 | A | * | 11/1998 | Chen ........................... 363/41 |
| 6,232,964 | B1 | | 5/2001 | Lee |
| 6,728,117 | B2 | * | 4/2004 | Schemmann et al. ...... 363/21.12 |
| 6,813,170 | B2 | * | 11/2004 | Yang ........................ 363/56.09 |
| 2002/0146253 | A1 | | 10/2002 | Kondo et al. |
| 2007/0164717 | A1 | * | 7/2007 | Osaka ........................ 323/282 |

FOREIGN PATENT DOCUMENTS

| | | |
|---|---|---|
| CN | 1309458 A | 8/2001 |
| CN | 1357964 A | 7/2002 |
| JP | 2000-324834 | 11/2000 |
| KR | 98-5687 | 3/1998 |
| KR | 2000-59690 | 10/2000 |
| KR | 2003-67153 | 8/2003 |

OTHER PUBLICATIONS

Korean Office Action dated Oct. 27, 2006 issued in KR 2005-89890.
Chinese Office Action issued Jul. 4, 2008 (Chinese Patent Application No. 200610159304.8 Filed Sep. 27, 2006).

* cited by examiner

*Primary Examiner*—Jessica Han
(74) *Attorney, Agent, or Firm*—Stanzione & Kim LLP

(57) ABSTRACT

An energy effective switching power supply apparatus and an energy effective method thereof. The energy effective switching power supply apparatus includes a power transforming part having first and second coils to induce a voltage to the second coil using interactions between the first and the second coils with respect to the input voltage, a power outputting part to output a sensing signal when it is determined that a first DC voltage output by rectifying and smoothing the voltage induced to the second coil is greater than or equal to a reference voltage level, and a switching controlling part to adjust a switching frequency of a switching device to interrupt a current flowing in the first coil of the power transforming part when the sensing signal is received. Accordingly, a switching loss is controlled and an energy loss is reduced.

18 Claims, 4 Drawing Sheets

ENERGY EFFECTIVE SWITCHING POWER SUPPLY APPARATUS AND AN ENERGY EFFECTIVE METHOD THEREOF

CROSS-REFERENCE TO RELATED APPLICATIONS

This application claims the benefit under 35 U.S.C. § 119(a) of Korean Patent Application No. 2005-89890, filed Sep. 27, 2005, in the Korean Intellectual Property Office, the entire contents of which are incorporated herein by reference.

BACKGROUND OF THE INVENTION

1. Field of the Invention

The present general inventive concept relates to an energy effective switching power supply apparatus and an energy effective method thereof. More particularly, the present general inventive concept relates to an energy effective switching power supply apparatus and an energy effective method thereof that saves energy by improving power efficiencies of an SMPS (Switching Mode Power Supply) used as a switching power apparatus in electronics appliances.

2. Description of the Related Art

Generally, an SMPS (Switching Mode Power Supply) is used as a switching power supply apparatus in an image forming apparatus, such as a printer. The SMPS refers to an apparatus that rectifies an AC (alternating current) voltage externally input and supplies the rectified voltage to each part of an electronics appliance.

The SMPS reduces power loss by having a switching device operating in a switching mode to reduce power loss, and is compact-sized by use of a high frequency power transformer. The SMPS is designed to simultaneously output DC voltages (Direct current) having different amplitudes. For example, it is possible to simultaneously output DC voltages of 3.3V or 5V supplied to a main power supply in a printer, and a DC voltage of 24V supplied to a HVPS (High Voltage Power Supply) and a printing engine part.

FIG. 1 illustrates a conventional switching power supply apparatus.

Referring to FIG. 1, the switching power supply apparatus includes an external power inputting part 10, a rectifying part 20, a switching controlling part 30, a power transforming part 40, a first power outputting part 50, a second power outputting part 60, and a feedback circuit part 70.

The external power inputting part 10 receives an AC power from an external power supply (not shown) as an input. The rectifying part 20 rectifies the input AC power using a bridge diode (not shown) and a capacitor (not shown), and outputs a DC power. The DC power output from the rectifying part 20 is supplied to a first coil of a power transformer of the power transforming part 40, and the power transforming part 40 induces a voltage to a second coil by interactions between the first coil and the second coil.

The switching controlling part 30 interrupts electric current flowing in the first coil of the power transforming part 40 and controls the voltage induced to the second coil of the power transforming part 40. The voltage induced to the second coil of the power transforming part 40 is rectified and smoothed by a first power outputting part 50 and a second power outputting part 60, respectively. The first power outputting part 50 outputs a first DC voltage Va as a first output voltage, and the second power outputting part 60 outputs a second DC voltage Vb as a second output voltage.

The switching controlling part 30 has a PWM-IC (Pulse Width Modulation-integrated Circuit) 35, and the PWM-IC 35 is connected to the first coil of the power transforming part 40 through a transistor TR1. An OUT terminal of the PWM-IC 35 turns on/off the transistor TR1, interrupts the current flowing in the first coil and controls the voltage induced to the second coil of the power transforming part 40.

A diode D1, a resistance R1, and a first capacitor C1 rectify and smooth a current flowing in an auxiliary coil of the power transforming part 40 and supply an operating power to a Vcc terminal of the PWM-IC 35. A switching frequency is determined with respect to the transistor TR1 output to the OUT terminal by a capacitance of a second capacitor C2 connected to a CT terminal of the PWM-IC 35.

The feedback circuit part 70 senses the second output voltage of the second power outputting part 60 and transmits a feedback signal to an FB terminal of the PWM-IC 35. An operation of the PWM-IC 35 is determined according to the transmitted feedback signal. That is, when the second output voltage of the second power outputting part 60 is higher than a reference voltage, the feedback circuit part 70 transmits a feedback signal instructing the PWM-IC 35 to stop operating.

Likewise, the conventional switching power supply apparatus switches the transistor TR1 ON or OFF at a uniform frequency all the time, regardless of changes of the first and second output voltages Va and Vb, respectively, and accordingly, a switching loss is incurred and unnecessary power consumption occurs. If an output current of the first power outputting part 50 rises, the second output voltage of the second power outputting part 60 rises by cross regulation, and an apparatus that is supplied with the second output voltage by the second power outputting part 60 may be damaged by the increase in the second output voltage.

SUMMARY OF THE INVENTION

The present general inventive concept provides an energy effective switching power supply apparatus and an energy effective method thereof to adjust a switching frequency of a PWM-IC (Pulse Width Modulation-integrated Circuit) in order to prevent unnecessary power consumption and damages caused by overvoltage.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a switching power supply apparatus including a power transforming part having first and second coils to induce voltage to the second coil using interactions between the first and the second coils with respect to an input voltage received on the first coil, a power outputting part to output a sensing signal when it is determined that a first DC voltage output by rectifying and smoothing the voltage induced to the second coil is greater than or equal to a reference voltage level, and a switching controlling part to adjust a switching frequency of a switching device to interrupt a current flowing in the first coil of the power transforming part when the sensing signal is received.

The power outputting part may output the sensing signal by operating an LED (Light Emitting Diode) when the first DC voltage output is greater than or equal to the reference voltage level.

A capacitance may be changed by a photo transistor operated by the LED to serve as a photo coupler, and the switching controlling part may adjust the switching frequency of the switching device based on the changed capacitance.

When the first DC voltage is greater than or equal to the reference voltage level, the LED of the power outputting part is operated by a photo programmable shunt diode.

The foregoing and/or other aspects of the present general inventive concept may also be achieved by providing a power supply apparatus, including a transformer to receive an input voltage at a first coil and to output at least one output voltage on at least one second coil, a controller to switch the transformer ON and OFF at two or more operating frequencies to regulate the at least one output voltage according to a feedback signal, and at least one power output part to receive the at least one output voltage from the transformer, to output at least one output DC voltage, and to provide a first feedback signal to the controller to decrease the frequency with which the transformer is switched when the at least one output DC voltage is greater than a reference voltage level.

The foregoing and/or other aspects of the present general inventive concept may also be achieved by providing an energy effective method of a switching power supply apparatus, the method including receiving an input voltage on a first coil of a power transforming part including the first coil and a second coil, inducing a voltage to the second coil using interactions between the first and the second coils with respect to the input voltage, outputting a sensing signal when a DC voltage output by rectifying and smoothing the voltage induced to the second coil is determined to be greater than or equal to a reference voltage level, and adjusting a switching frequency of a switching device to interrupt a current flowing in the first coil when the sensing signal is received.

The outputting of the sensing signal may include outputting the sensing signal by operating an LED when the DC voltage is greater than or equal to the reference voltage level.

The adjusting of the switching frequency of the switching device may include changing a capacitance by operating a photo transistor with the LED to serve as a photo coupler.

The outputting of the sensing signal may include operating the LED with a photo programmable shunt diode when the DC voltage is greater than or equal to the reference voltage level.

The foregoing and/or other aspects of the present general inventive concept may also be achieved by providing a method of switching power, the method including transforming an input voltage received on a first coil of a transformer to induce at least one output voltage on a second coil, interrupting current flowing through the first coil of the transformer and inducement of the at least one output voltage on the second coil according to a switching control signal, rectifying the at least one output voltage induced on the second coil to at least one DC output voltage, determining whether the at least one DC output voltage is greater than a reference voltage, and operating a photocoupler to adjust a frequency of the switching control signal when it is determined that the at least one DC output voltage is greater than the reference voltage.

BRIEF DESCRIPTION OF THE DRAWINGS

The above aspects of the present general inventive concept will be more apparent by describing certain embodiments of the present general inventive concept with reference to the accompanying drawings, in which.

DETAILED DESCRIPTION OF THE PREFERRED EMBODIMENTS

Figure 1:
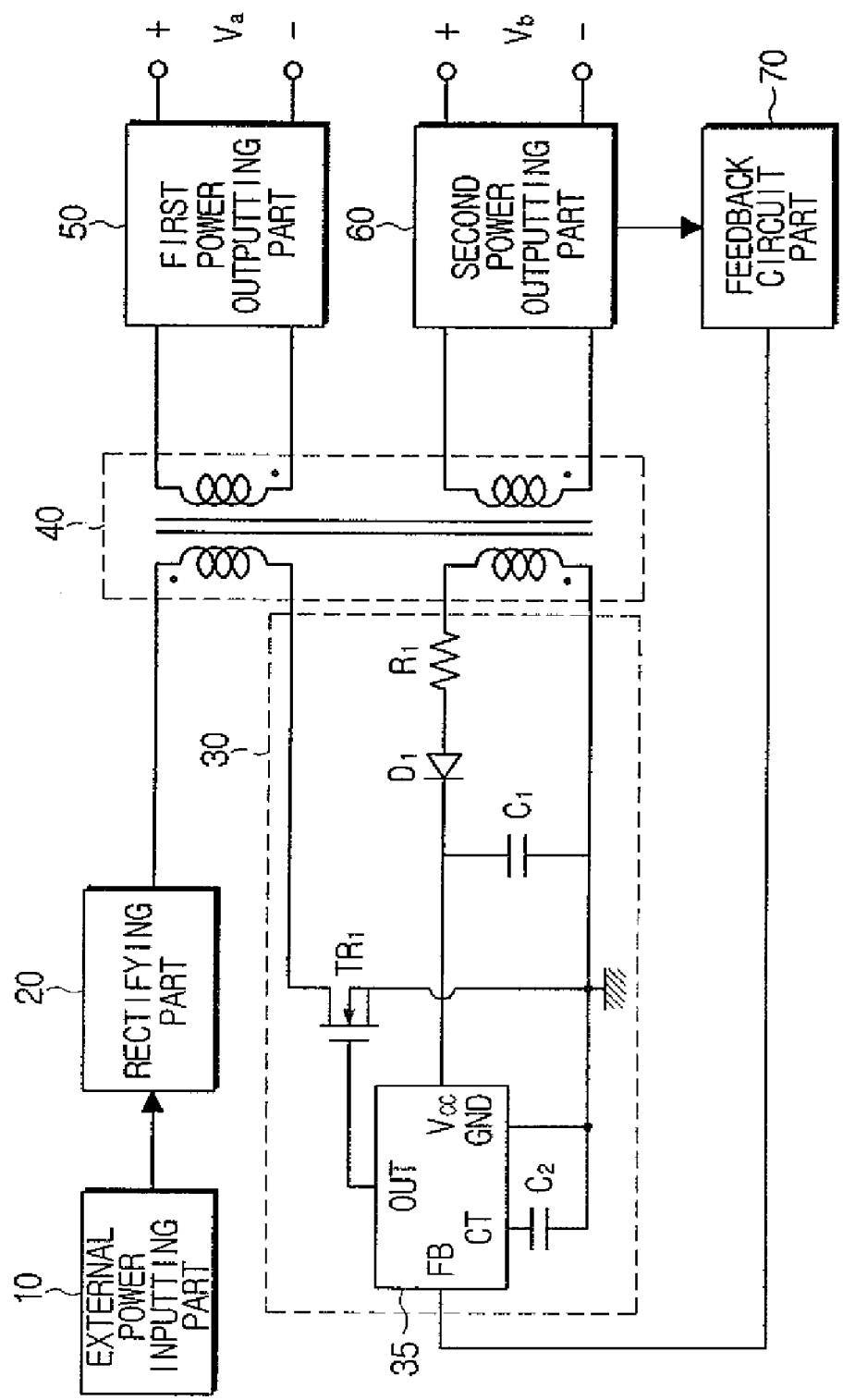
FIG. 1 illustrates a conventional switching power supply apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
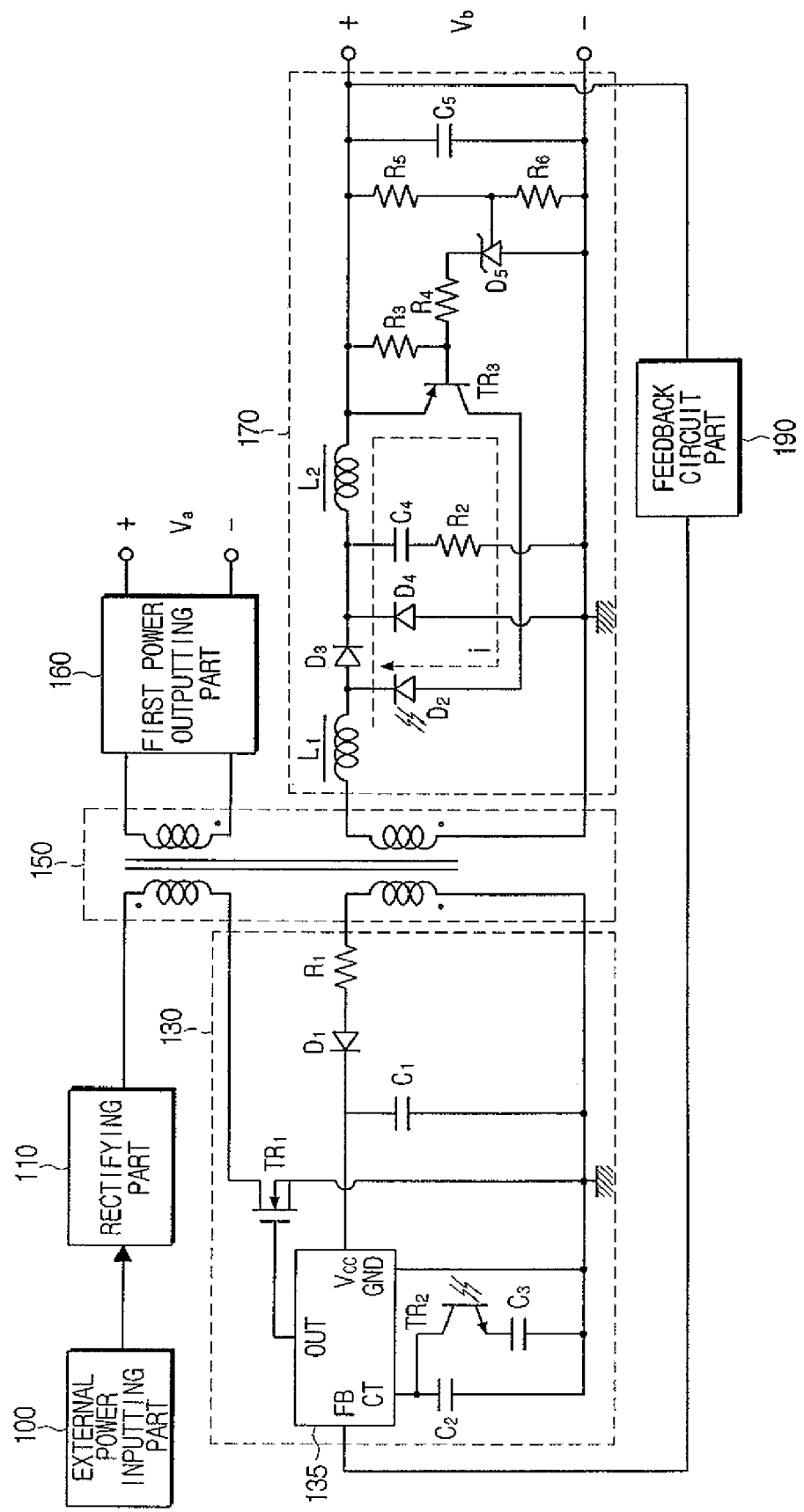
FIG. 2 illustrates a switching power supply apparatus according to an embodiment of the present general inventive concept.

FIG. 2 illustrates a switching power supply apparatus according to an embodiment of the present general inventive concept.

Referring to FIG. 2, the switching power supply apparatus includes an external power inputting part 100, a rectifying part 110, a switching controlling part 130, a power transforming part 150, a first power outputting part 160, a second power outputting part 170, and a feedback circuit part 190.

The external power inputting part 100 receives an AC (Alternating Current) power from an external power supply (not shown) as an input.

The rectifying part 110 rectifies the input AC power and outputs a DC (Direct Current) voltage (power) using, for example, a bridge diode (not shown) and a capacitor (not shown). The DC voltage output from the rectifying part 110 is supplied to a first (or primary) coil of the power transforming part 150.

The power transforming part 150 induces a voltage to a second (or secondary) coil and an auxiliary coil by interactions between the first coil and the second coil. The auxiliary coil is connected to the switching controlling part 130.

The switching controlling part 130 interrupts a current flowing through the first coil of the power transforming part 150, thereby controlling the voltage induced to the second coil and the auxiliary coil of the power transforming part 150. The switching controlling part 130 includes a PWM-IC (Pulse Width Modulation-integrated Circuit) 135, transistors TR1 and TR2, capacitors C1, C2, and C3, diodes D1 and D2, and a resistance R1.

The PWM-IC 135 is connected to one end of the first coil of the power transforming part 150 through the transistor TR1. The transistor TR1 may be a MOSFET (Metal oxide Semiconductor Field Effect). An OUT terminal of the PWM-IC 135 controls the voltage induced to the second coil and the auxiliary coil of the power transforming part 150 by turning the transistor TR1 ON and OFF, thereby interrupting the current of the first coil.

The diode D1, the resistance R1, and the capacitor C1 rectify and smooth a current flowing in the auxiliary coil of the power transforming part 150 and supply a Vcc terminal of the PWM-IC 135 with operating power to operate the PWM-IC 135.

A CT terminal of the PWM-IC 135 determines a switching frequency output to the OUT terminal of the PWM-IC 135, and the switching frequency is determined by a capacitance of the capacitor C2 connected to the CT terminal. The transistor TR2 may be a phototransistor. When the phototransistor TR2 turns OFF in FIG. 2, the switching frequency is determined by the capacitance C2. When the phototransistor TR2 turns ON, the switching frequency is determined by the capacitances C2 and C3. Since the capacitance at the CT terminal of the PWM-IC 135 increases by parallel connections between the capacitors C2 and the C3, the switching frequency decreases.

The voltage induced to the second coil of the power transforming part 150 is rectified and smoothed at the first and second power outputting parts 160 and 170, respectively. The first power outputting part 160 outputs a first DC voltage Va as a first output voltage, and the second power outputting part 170 outputs a second DC voltage Vb as a second output voltage. The switching power supply apparatus may alternatively include a greater number of power outputting parts.

The second power outputting part 170 includes coils L1 and L2 (i.e., inductances), diodes D2 through D5, capacitors C4 and C5, resistances R2 through R6, and a transistor TR3.

The coil L2 is used for a forward converter, and is charged with a current when a high voltage is supplied to the first coil of the power transforming part 150. When a low voltage is supplied to the first coil of the power transforming part 150, the current charged at the coil L2 flows through the capacitor C5 and the diode D4, and the current charged at the coil L2 supplements current shortages and outputs the second DC voltage Vb.

The coil L1 may be a MAG-AMP coil used for a magnetic amplifier. The magnetic amplifier controls load current by changes in an input current, using the fact that reactance of a coil changes depending on a current level thereof. That is, the magnetic amplifier prevents the first outputting part 160 from causing cross regulation to occur at the second power outputting part 170.

For example, if the current of the first power outputting part 160 rises and the second output voltage of the second power outputting part 170 increases, current "i" which represents the current charged at the coil L1 flows through the diode D3 and the transistor TR3, and the diode D2 is turned ON. The transistor TR3 is turned ON by the diode D5 (e.g., Programmable Shunt Diode or Zener diode) operating when the second output voltage Vb is greater than or equal to a first reference voltage.

When the second output voltage Vb is greater than or equal to the first reference voltage, the diode D2 is turned ON, and the diode D2 of the second power outputting part 170 and the transistor TR2 of the switching controlling part 130 are operated by a photo coupler. Accordingly, the capacitor C2 and the capacitor C3 are connected in parallel to the CT terminal of the PWM-IC 135 and the switching frequency output to the OUT terminal decreases, to reduce a switching loss.

The feedback circuit part 190 senses the second output voltage Vb of the second power outputting part 170 and transmits a feedback signal to an FB terminal of the PWM-IC 135. When the second output voltage of the second power outputting part 170 is greater than or equal to a second reference voltage, the feedback circuit part 190 transmits a stop feedback signal to stop an operation of the PWM-IC 135. Voltages of different levels may be used as the second reference voltage of the feedback circuit part 190 and the first reference voltage determined by the diode D5, respectively. In particular, the second reference voltage may be greater than the first reference voltage. Since general feedback circuits should be known to those of ordinary skill in the art, a detailed description of the feedback circuit part 190 will not be provided here.

Figure 3:
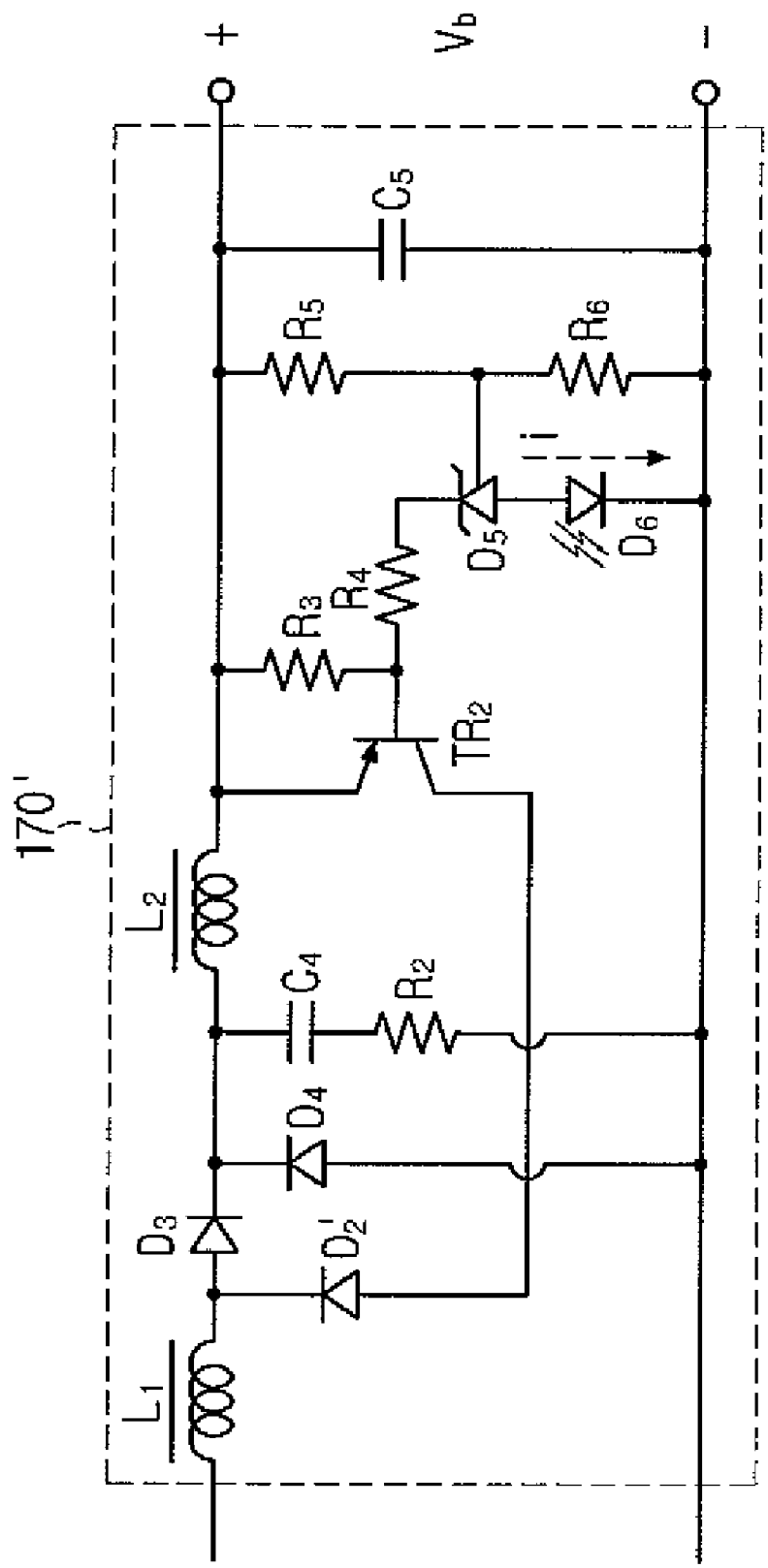
FIG. 3 illustrates a second power outputting part according to an exemplary embodiment of the present general inventive concept.

FIG. 3 illustrates another example of a second power outputting part 170'.

Referring to FIGS. 2 and 3, in the second power outputting part 170' of the switching power supply apparatus, a diode D6 is operated with the transistor TR2 as the photo coupler.

More particularly, when the second output voltage Vb of the second power outputting part 170 is greater than or equal to the first reference voltage, the diode D5 operates, the current "i" flows and the diode D6 turns ON. Accordingly, the capacitors C2 and C3 (see FIG. 2) are connected in parallel to the CT terminal of the PWM-IC 135. The switching frequency output to the OUT terminal decreases and the switching loss decreases.

Figure 4:
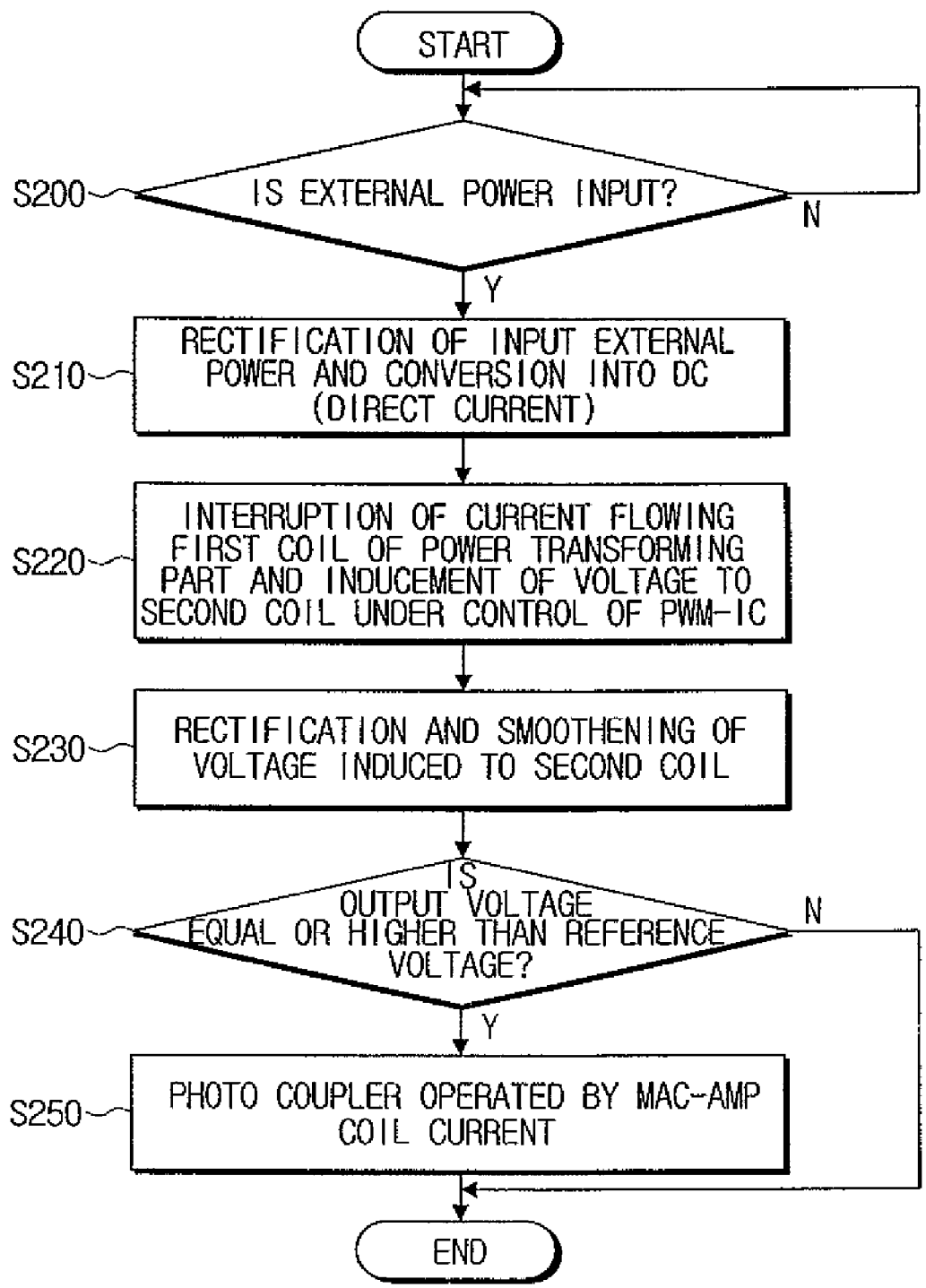
FIG. 4 is a flowchart illustrating an operation of the switching power supply apparatus according to an embodiment of the present general inventive concept.

FIG. 4 is a flowchart illustrating an operation of the switching power supply apparatus according to an embodiment of the present general inventive concept. The operation of the switching power supply apparatus is described below with reference to FIGS. 2 and 3.

Referring to FIGS. 2 and 4, when the external power is input (operation S200), the input external power is rectified and converted into the DC voltage. That is, the rectifying part 110 rectifies the external power input through the external power inputting part 100 using, for example, the bridge diode (not shown) and the condenser (not shown), and outputs the DC voltage (operation S210).

The PWM-IC 135 controls interruption of the current flowing in the first coil of the power transforming part 150 and the inducement of the voltage to the second coil. In other words, the DC voltage output from the rectifying part 110 is supplied to the first coil of the power transforming part 150 and the switching controlling part 130 interrupts the current flowing in the first coil of the power transforming part 150, thereby controlling the voltage induced to the second coil (operation S220).

The first and the second power outputting parts 160 and 170 (or 170') rectify and smooth the voltage induced to the second coil, and output the first and second output voltages Va and Vb, respectively (operation S230).

When the second output voltage output by the second power outputting part 170 (or 170') is greater than or equal to the first reference voltage at operation S240, the photo coupler is operated by the current "i." That is, if the second output voltage Vb is greater than or equal to the reference voltage, the current "i" charged to the coil L1 turns ON the diode D2 (see FIG. 2) or the diode D6 (see FIG. 3). When the diode D2 or the diode D6 are turned on, the transistor TR2 is operated by the diode D2 or the diode D6, and the photo coupler is turned ON.

Accordingly, the capacitor C2 and the capacitor C3 are connected in parallel to the CT terminal of the PWM-IC 135 such that the switching frequency output to the OUT terminal decreases, and the switching loss decreases.

The cross regulation is finished, and when the second output voltage Vb is maintained less than or equal to the first reference voltage, the current "i" does not flow, and the diode D2 (see FIG. 2) or the diode D6 (see FIG. 2) stop emitting the light. Finally, the capacitance connected to the CT terminal of the PWM-IC 135 gets normalized (i.e., back to C2) and the switching frequency gets back to an original state. The method may further include a feedback operation performed by the feedback circuit part 190. For example, the feedback operation may be performed continuously, periodically, or as part of the operation S240. As described above, the feedback operation can be used to cut off operation of the PWM-IC 135 when the second output voltage Vb is greater than or equal to the second reference voltage.

As described above, the coil L1 is actively operated when a sensed output voltage (i.e., the second output voltage Vb) is greater than or equal to a certain voltage level (i.e., the first reference voltage). As the second output voltage Vb increases, a switching frequency of the PWM-IC 135 decreases, so that switching loss decreases such that unnecessary power consumption and overvoltage-causing damage can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A switching power supply apparatus comprising:
a power transforming part having first and second coils to induce a voltage to the second coil using interactions between the first and the second coils with respect to an input voltage received on the first coil;
a power outputting part to output a sensing signal when a first DC voltage output is greater than or equal to a reference voltage level, where the first DC voltage is the voltage induced to the second coil that has been rectified and smoothed; and
a switching controlling part to adjust a switching frequency of a switching device to interrupt a current flowing in the first coil of the power transforming part when the sensing signal is received.

2. The switching power supply apparatus of claim 1, wherein the power outputting part comprises an LED (Light Emitting Diode) to output the sensing signal when the first DC voltage output is greater than or equal to the reference voltage level.

3. The switching power supply apparatus of claim 2, wherein a capacitance is changed by a phototransistor operated by the LED to serve as a photo coupler, and the switching controlling part adjusts the switching frequency of the switching device based on the changed capacitance.

4. The switching power supply apparatus of claim 2, wherein when the first DC voltage is greater than or equal to the reference voltage level, the LED of the power outputting part is operated by a photo programmable shunt diode.

5. The switching power supply apparatus of claim 1 wherein the switching controlling part comprises a phototransistor to receive the sensing signal to adjust the switching frequency.

6. The switching power supply apparatus of claim 1, wherein the switching controlling part comprises a pulse width modulation integrated circuit (PWM-IC), the PWM-IC including:
a CT terminal connected to a variable capacitance that is variable between a first capacitance and a second capacitance to adjust the switching frequency of the switching device when the sensing signal is received; and
an output terminal to output the switching frequency to the switching device to control the current flowing through the first coil of the power transforming part.

7. The switching power supply apparatus of claim 6, wherein the PWM-IC further comprises:
a feedback terminal to receive a stop signal from a feedback circuit part to stop operation of the switching device when the first DC voltage gets too high.

8. The switching power supply apparatus of claim 6, wherein the variable capacitance connected to the CT terminal of the PWM-IC comprises:
a first capacitor connected to the CT terminal;
a three terminal switching device connected in parallel with the first capacitor to be operated between an ON state and an OFF state by the sensing signal; and
a second capacitor connected in parallel with the first capacitor when the three terminal device is operated in the ON state and not to be connected in parallel with the first capacitor when the three terminal device is operated in the OFF state.

9. The switching power supply apparatus of claim 1, wherein the power outputting part comprises:
a second outputting part to receive a second AC voltage induced by the first coil on a second portion of a second coil of the power transforming part, to rectify the second AC voltage to a corresponding second DC voltage, and to output the corresponding second DC voltage; and
a first outputting part to receive a first AC voltage induced by the first coil on a first portion of the second coil of the power transforming part, to rectify the first AC voltage to the corresponding first DC voltage, to output the first DC voltage, to output the sensing signal when the first DC voltage is greater than or equal to the reference voltage level.

10. The switching power supply apparatus of claim 9, wherein the first outputting part comprises:
a magnetic amplifier inductance coil to receive an induced current from the second portion of the second coil of the second power transforming part and to regulate current flow in the first power outputting part;
a forward converter inductance coil to receive the current flow from the magnetic amplifier inductance coil and to output the first DC voltage; and
a sensing signal outputting part to output the sensing signal when the current through the forward converter inductance coil is greater than a predetermined amount.

11. The switching power supply apparatus of claim 10, wherein the magnetic amplifier inductance coil prevents cross regulation from occurring between the first and second outputting parts.

12. The switching power supply apparatus of claim 11, wherein the sensing signal outputting part comprises a photodiode and the variable capacitance is change between the first capacitance and the second capacitance by a phototransistor that is operable by the photodiode.

13. The switching power supply apparatus of claim 10, wherein the switching controlling part comprises a variable capacitance that is variable between a first capacitance and a second capacitance to adjust the switching frequency of the switching device when the sensing signal is received.

14. An energy effective method of a switching power supply apparatus, the method comprising:
receiving an input voltage on a first coil of a power transforming part including the first coil and a second coil;
inducing a voltage to the second coil using interactions between the first and the second coils with respect to the input voltage;
outputting a sensing signal when a DC voltage output by rectifying and smoothing the voltage induced to the second coil is determined to be greater than or equal to a reference voltage level; and
adjusting a switching frequency of a switching device to interrupt a current flowing in the first coil of the power transforming part when the sensing signal is received.

15. The energy effective method of switching power supply apparatus of claim 14, wherein the outputting of the sensing signal comprises outputting the sensing signal by operating an LED when the DC voltage is greater than or equal the reference voltage level.

16. The energy effective method of switching power supply apparatus of claim 15, wherein the adjusting of the switching frequency of the switching device comprises changing a capacitance by operating a photo transistor with the LED to serve as a photo coupler.

17. The energy effective method of switching power supply apparatus of claim 15, wherein the outputting of the sensing signal comprises operating the LED with a photo programmable shunt diode when the DC voltage is greater than or equal to the reference voltage level.

18. A method of switching power, the method comprising:

transforming an input voltage received on a first coil of a transformer to at least one output voltage on a second coil;

interrupting current flowing through the first coil of the transformer and inducement of the at least one voltage on the second coil according to a switching control signal;

rectifying the at least one output voltage induced on the second coil to at least one DC output voltage;

determining whether the at least one DC output voltage is greater than a reference voltage; and operating a photocoupler to adjust a frequency of the switching control signal when the at least one DC output voltage is greater than a reference voltage.

* * * * *

UNITED STATES PATENT AND TRADEMARK OFFICE
CERTIFICATE OF CORRECTION

PATENT NO. : 7,663,896 B2
APPLICATION NO. : 11/277659
DATED : February 16, 2010
INVENTOR(S) : Tae-kwon Na It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Twenty-eighth Day of December, 2010

David J. Kappos
*Director of the United States Patent and Trademark Office*